US012585115B2

(12) United States Patent
Briggs

(10) Patent No.: US 12,585,115 B2
(45) Date of Patent: Mar. 24, 2026

(54) VIRTUAL REALITY SYSTEMS AND METHODS

(71) Applicant: Lifecast Incorporated, Menlo Park, CA (US)

(72) Inventor: Forrest Briggs, Palo Alto, CA (US)

(73) Assignee: Stevens Law Group, P.C., San Jose, CA (US)

( * ) Notice: Subject to any disclaimer, the term of this patent is extended or adjusted under 35 U.S.C. 154(b) by 721 days.

(21) Appl. No.: 17/867,036

(22) Filed: Jul. 18, 2022

(65) Prior Publication Data

US 2023/0018560 A1     Jan. 19, 2023

Related U.S. Application Data

(60) Provisional application No. 63/223,232, filed on Jul. 19, 2021.

(51) Int. Cl.
*G02B 27/01*     (2006.01)
*G02B 27/00*     (2006.01)

(52) U.S. Cl.
CPC ..... *G02B 27/0172* (2013.01); *G02B 27/0093* (2013.01); *G02B 2027/0138* (2013.01); *G02B 2027/0178* (2013.01)

(58) Field of Classification Search
CPC ........ G06F 3/011; G06F 3/012; G06F 3/0482; G06F 3/04815; G06F 3/04845; G06F 3/1454; G06T 15/00; G06T 15/08; G06T 15/20; G06T 15/205; G06T 19/00; G06T 19/003; G06T 19/006; G06T 19/20; G02B 27/01; G02B 27/0101; G02B 27/0093; G02B 27/0134; G02B 27/017; G02B 27/0176; G02B 27/0178
See application file for complete search history.

(56) References Cited

U.S. PATENT DOCUMENTS

| | | | |
|---|---|---|---|
| 9,788,714 B2 | 10/2017 | Krueger | |
| 2019/0056848 A1 | 2/2019 | Diverdi et al. | |
| 2019/0083885 A1 | 3/2019 | Yee | |
| 2020/0134779 A1* | 4/2020 | McEwen | G06T 15/04 |
| 2020/0167009 A1* | 5/2020 | Orr | A61B 5/1121 |
| 2020/0317089 A1 | 10/2020 | Friedrich | |
| 2020/0334788 A1 | 10/2020 | Izumi | |
| 2020/0380765 A1 | 12/2020 | Thudor et al. | |
| 2021/0304508 A1* | 9/2021 | Kim | G06T 19/20 |
| 2021/0311320 A1* | 10/2021 | Pike | G06T 7/73 |
| 2021/0343087 A1* | 11/2021 | Gomez Gonzalez | G06F 3/013 |
| 2021/0373654 A1* | 12/2021 | Franci Rodon | G06F 3/011 |
| 2023/0047123 A1* | 2/2023 | Briggs | G06T 5/80 |

* cited by examiner

*Primary Examiner* — Sultan Chowdhury
(74) *Attorney, Agent, or Firm* — David R. Stevens; Stevens Law Group

(57)     ABSTRACT

Example virtual reality systems and methods are described. In one implementation, a camera captures 6DOF (6 Degrees of Freedom) 3D (Three-Dimensional) videos while the camera is in motion. A rendering system renders the 6DOF 3D videos while minimizing vestibulo-ocular conflict. A virtual reality system presents the rendered 6DOF 3D videos to a user of the virtual reality system.

9 Claims, 16 Drawing Sheets

106

RENDERING SYSTEM

COMMUNICATION
MANAGER
502

MEMORY
506

3D SCENE
RECONSTRUCTION
MODULE
510

PROCESSOR
504

MOTION
ESTIMATION
MODULE
508

RENDERING,
PROJECTION, AND
COMPRESSION
MODULE
512

600

A VIDEO DECOMPRESSOR COMPONENT
RECEIVES DATA AND DECOMPRESSES
THE RECEIVED DATA
602

A GRAPHICS PROCESSING UNIT (GPU)
EXECUTES VERTEX AND FRAGMENT
SHADERS
604

A VIRTUAL REALITY (VR) HEAD-
MOUNTED DISPLAY (HMD) RENDERING
API CALLS A VR HMD TO DISPLAY THE
RECEIVED DATA
606

104 ⌐

VIRTUAL REALITY SYSTEM

COMMUNICATION
MANAGER
702

MEMORY
706

GRAPHICS
PROCESSING
UNIT (GPU)
710

DATA STORAGE
MANAGER
714

PROCESSOR
704

VIDEO
DECOMPRESSOR
MODULE
708

VIRTUAL REALITY
HEAD-MOUNTED
DISPLAY
RENDERING API
712

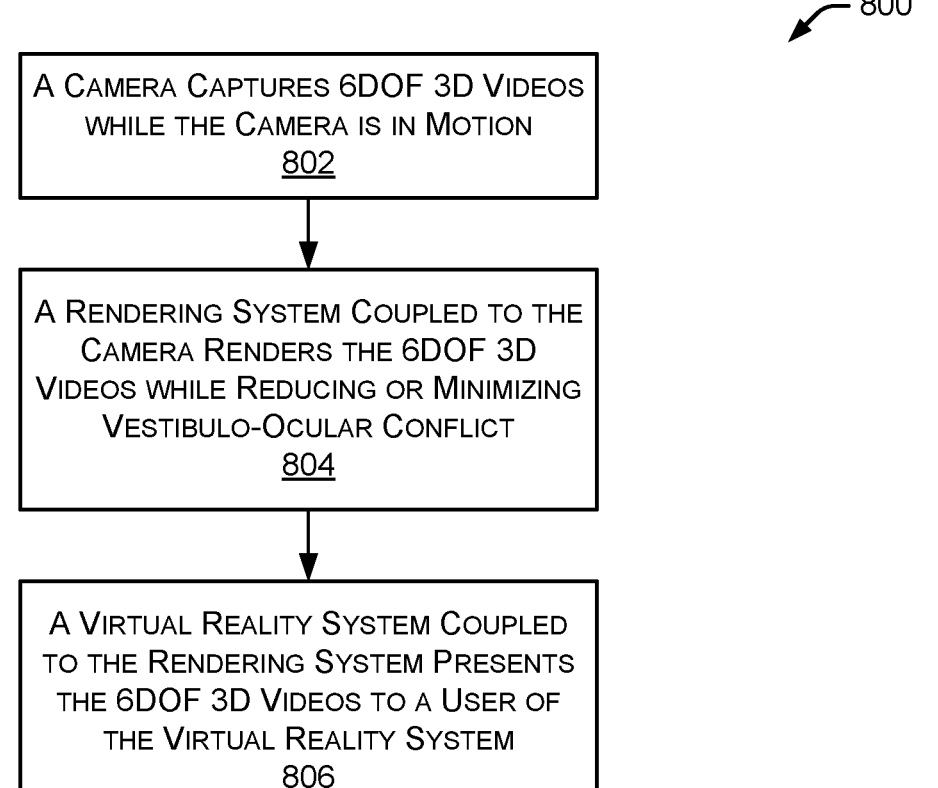
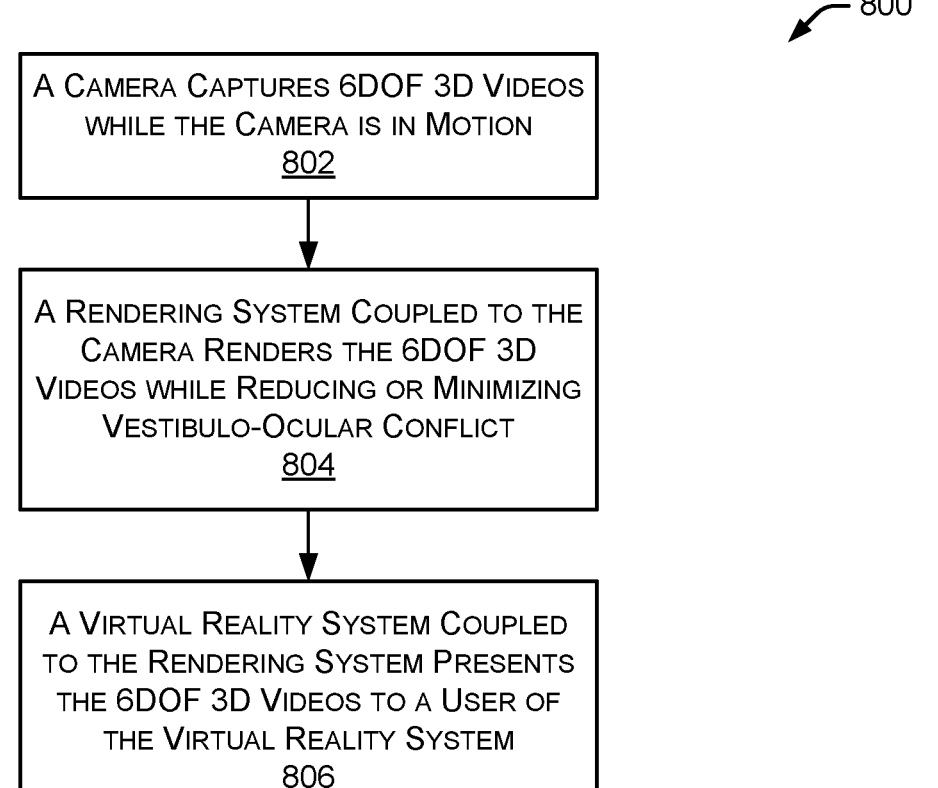
800
A Camera Captures 6DOF 3D Videos while the Camera is in Motion
802
A Rendering System Coupled to the Camera Renders the 6DOF 3D Videos while Reducing or Minimizing Vestibulo-Ocular Conflict
804
A Virtual Reality System Coupled to the Rendering System Presents the 6DOF 3D Videos to a User of the Virtual Reality System
806
FIG. 8

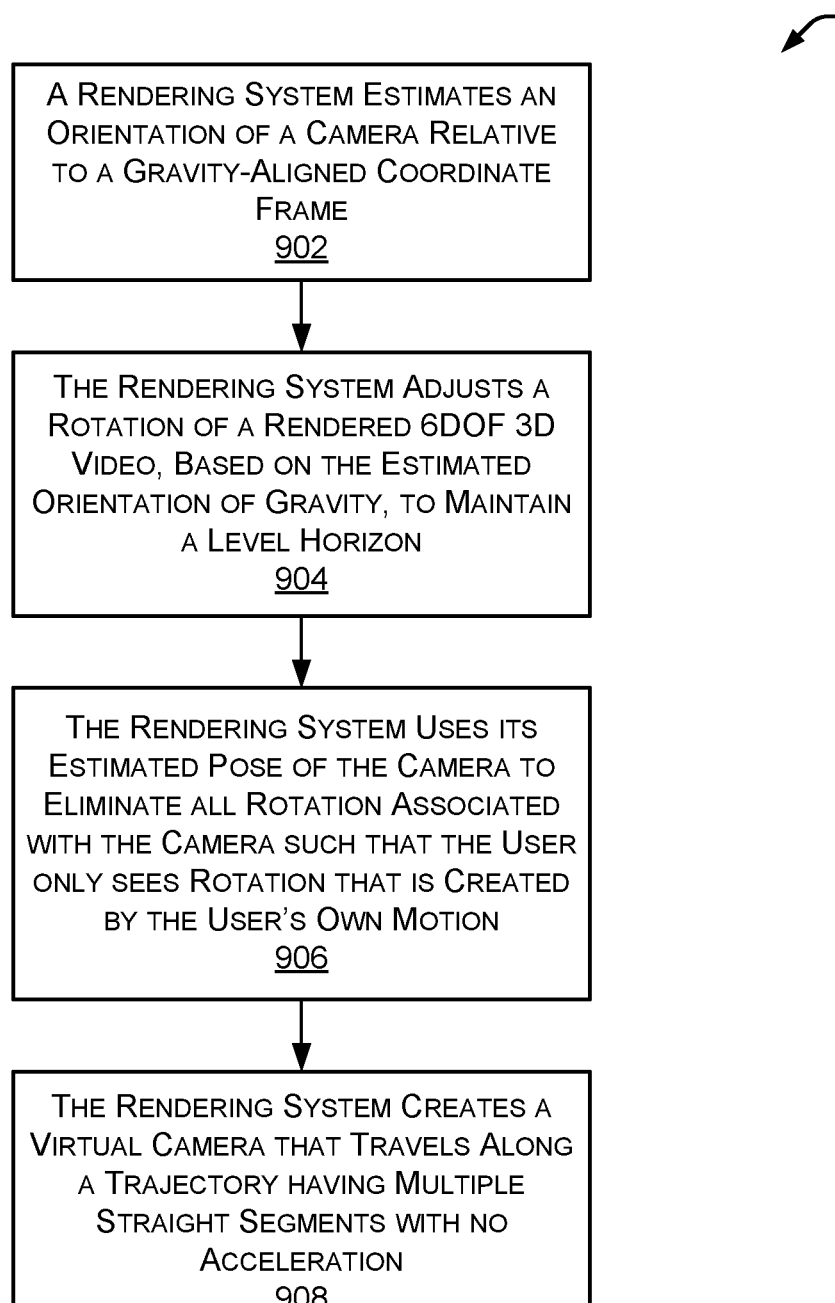

900

A RENDERING SYSTEM ESTIMATES AN
ORIENTATION OF A CAMERA RELATIVE
TO A GRAVITY-ALIGNED COORDINATE
FRAME
902

THE RENDERING SYSTEM ADJUSTS A
ROTATION OF A RENDERED 6DOF 3D
VIDEO, BASED ON THE ESTIMATED
ORIENTATION OF GRAVITY, TO MAINTAIN
A LEVEL HORIZON
904

THE RENDERING SYSTEM USES ITS
ESTIMATED POSE OF THE CAMERA TO
ELIMINATE ALL ROTATION ASSOCIATED
WITH THE CAMERA SUCH THAT THE USER
ONLY SEES ROTATION THAT IS CREATED
BY THE USER'S OWN MOTION
906

THE RENDERING SYSTEM CREATES A
VIRTUAL CAMERA THAT TRAVELS ALONG
A TRAJECTORY HAVING MULTIPLE
STRAIGHT SEGMENTS WITH NO
ACCELERATION
908

VIRTUAL REALITY SYSTEMS AND METHODS

RELATED APPLICATIONS

This application claims the priority benefit of U.S. Provisional Application Ser. No. 63/223,232, filed on Jul. 19, 2021, the disclosure of which is hereby incorporated by reference herein in its entirety.

TECHNICAL FIELD

The present disclosure relates to systems and methods related to the capturing and rendering of media, such as media used in virtual reality, augmented reality, and mixed reality systems.

BACKGROUND

There are many formats of video for virtual reality (VR) applications. VR video may differ from traditional video in that it is viewed in a VR head-mounted display (HMD), and in some cases may allow a viewer to look in different directions or move their head to look from different points of view.

In some situations, VR video formats differ in field of view, whether they appear to a viewer as 2D or 3D, and whether they support three degrees of freedom or six degrees of freedom (3DOF or 6DOF). Different VR video formats may use different projections to map a rectangular video or texture to a sphere (e.g., equirectangular projection, or cubemap).

In many existing VR systems, motion sickness may occur when the viewer's eyes and inner ear provide conflicting information regarding any motion of the viewer's head. This motion sickness may result in an unpleasant VR experience for the user and may cause users to stop using the VR system. The need exists for systems and methods that can overcome this problem.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

FIG. 8 is a flow diagram illustrating an embodiment of a process for presenting virtual reality videos to a user.

FIG. 9 is a flow diagram illustrating an embodiment of a process for reducing or eliminating vestibulo-ocular conflict.

DETAILED DESCRIPTION

Figure 1:
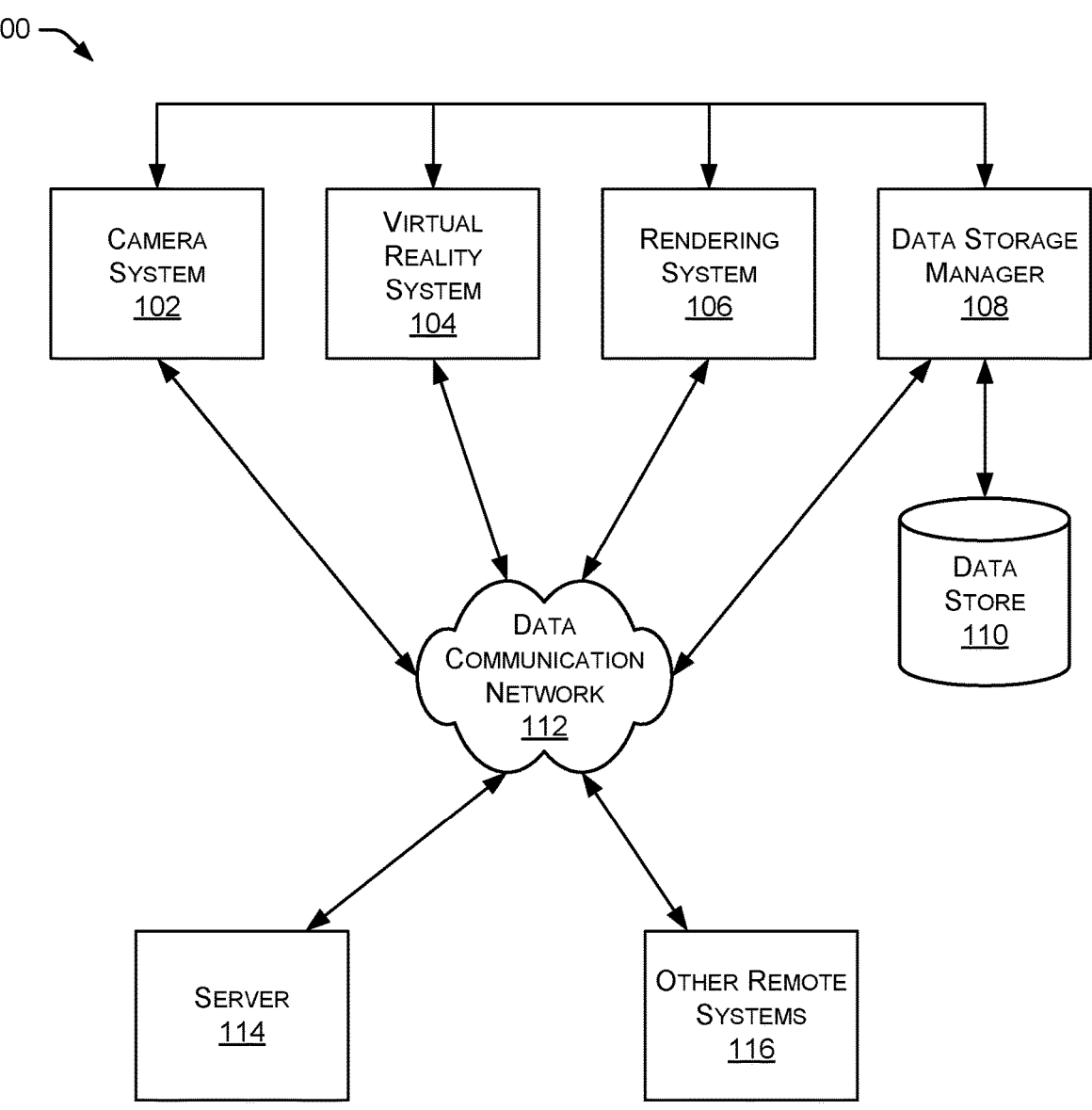
FIG. 1 is a block diagram illustrating an environment within which an example embodiment may be implemented.

In some embodiments, the systems and methods discussed herein perform various image capture, image processing, image rendering, and related activities. The described systems and methods may be used with wearable devices, computer vision, graphics, digital cameras, 360 cameras, virtual reality systems, augmented reality (AR) systems, mixed reality systems, immersive media, and the like.

In particular embodiments, these systems and methods are used to reduce or eliminate problems associated with motion sickness caused by vestibulo-ocular conflict. Vestibulo-ocular conflict occurs when the viewer's eyes and inner ear provide conflicting information regarding any motion of the viewer's head. For example, if a recording camera accelerates and the viewer watches the video without moving, the viewer's eyes will perceive motion, but their inner ear will not, which creates conflict and potential motion sickness.

In the following disclosure, reference is made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter is described in language specific to structural features and/or methodological acts, it is to be understood that the subject matter defined in the appended claims is not necessarily limited to the described features or acts described herein. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links)

through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed herein may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein for purposes of illustration, and are not intended to be limiting. Embodiments of the present disclosure may be implemented in further types of devices, as would be known to persons skilled in the relevant art(s).

At least some embodiments of the disclosure are directed to computer program products comprising such logic (e.g., in the form of software) stored on any computer useable medium. Such software, when executed in one or more data processing devices, causes a device to operate as described herein.

As discussed herein, there are many formats of video for virtual reality (VR). VR video differs from traditional video in that it is typically viewed in a VR head-mounted display (HMD), and in some cases allows a viewer to look in different directions or move their head to look from different points of view. VR video formats differ in field of view, whether they appear to a viewer as 2D or 3D, and whether they support three degrees of freedom or six degrees of freedom (3DOF or 6DOF). Different VR video formats may use different projections to map a rectangular video or texture to a sphere (e.g., equirectangular projection, or cubemap).

When viewed in a VR video player, 3DOF video formats respond to the user rotating their head along the axes of pitch, roll, and yaw, but do not respond to the user translating their head. In contrast, when viewed in a VR video player, 6DOF video formats respond to both the user rotating their head and translating their head.

In some embodiments, VR video is recorded by one or more VR video camera systems (sometimes referred to as "VR cameras" or "VR video cameras"). VR video cameras typically consist of one or more image sensors and lenses (sometimes called an "array of cameras"). In some implementations, multiple images are captured simultaneously to cover a larger field of view or to cover the same part of the scene from multiple different cameras.

VR video cameras may record images, then a separate software module called a "stitcher" processes the images to produce a VR video file that is ready to be played in VR (e.g., by warping the images to correct for lens distortion and then to an equirectangular projection, and/or using optical flow to smoothly transition between images from different cameras).

A basic example of a VR video format covers a 360 degree field of view (a full sphere), is 2D (the same image is shown to both eyes), supports 3DOF, and uses an equirectangular projection. This format may be referred to as mono-scopic (2D) 360 equirectangular. This format is commonly recorded by two back-to-back image sensors with 180 degree or larger field of view (FOV) lenses. For example, this format is produced by the GoPro-MAX 360 Degree 6K Action Camera.

Another common VR video format is omnidirectional stereo (ODS). ODS has a 360 degree field of view, approximates 3D by showing different images to the left and right eye, is 3DOF, and can be encoded in equirectangular, cubemap, or other projections. ODS videos are rendered in VR by wrapping one rectangular video/texture for each eye around a sphere. The textures for each eye are different in that they show the scene from a position that is offset from the other eye by the interpupillary distance. When viewed in a VR video player, ODS provides a plausible sense of 3D, and allows the user to look around in different directions. However, as discussed herein, ODS has problems and limitations. ODS is typically captured by an array of cameras in a ring or sphere arrangement. ODS typically requires more advanced methods than 2D formats for the stitcher to process the raw images from the cameras, such as methods involving optical flow and novel view synthesis. For example, this format is produced by Google's JUMP camera.

Another common VR video format is VR180. VR180 is similar to ODS, except the field of view is 180 degrees, so it only covers half of a sphere. Similar to ODS, there are two video textures, one-per-eye, that are projected onto a half-sphere. VR180 format is typically captured by a pair of cameras side-by-side and pointing in the same direction, each with a 180 degree fisheye lens. VR180 requires simpler stitching than ODS because it is not necessary to transition from one image to another, estimate depth, or perform optical flow. To produce VR180, the stitcher warps the image to correct for lens distortion and transforms the image into an equirectangular projection. An example of a professional-grade camera that produces VR180 format is the Z CAM K1 Pro Cinematic VR180 Camera. Snap Spectacles 3 are a pair of glasses that include an array of cameras, and are capable of producing VR180 format.

The formats discussed above may be referred to as 3DOF. There are some camera systems that are capable of producing 6DOF VR video. "Stitching" (the process of transforming the raw camera images into a format suitable for playback) is more complicated for 6DOF. Stitching camera images for 6DOF is not just a process of warping images. Instead, the process develops a 3D representation of the scene that is consistent with all of the images from each camera, using methods from multi-view computer vision and/or neural networks. This differs from ODS and VR180, which give the impression of 3D via a limited approximation. In contrast, these two systems for 6DOF video produce a correct 3D reconstruction of the scene which can be re-rendered in VR from any new virtual camera pose, although the rendering may degrade in quality as the virtual camera pose moves away from the real original camera pose.

Existing VR video formats and camera systems have various problems and limitations. Monoscopic/2D VR video is the easiest to produce, but it is less immersive, and does not create the same sense of "presence" as 3D formats. ODS and VR180 formats approximate 3D and are more immersive than 2D formats, but the views rendered in VR are often incorrect in a variety of common conditions. If the viewer rolls their head, the images rendered in VR do not respond correctly, which can cause the viewer to be unable to fuse the images, resulting in double vision. ODS and VR180 are not capable of correctly representing 3D in the azimuth and zenith directions, so they must either transition to 2D in these regions, or present incorrect images that can cause double vision in these directions. In ODS with equirectangular projection, only one column of pixels in the left or right eye's texture are correct for a given viewing direction, and the pixels on either side are correct for another similar viewing direction. This approximation causes a feeling of "swimming" or "warping" when users rotate their heads because they are not seeing correct images as their head moves over their whole field of view. ODS and VR180 are 3DOF, so they do not respond to the viewer translating their head. This can cause motion sickness from vestibulo-ocular conflict, as the viewer's inner ear will sense motion but their eyes will not. ODS and VR180 encode the interpupilary distance into the video file. If the encoded distance value doesn't match that of the user watching the video in VR, the perceived scale of the scene will be altered.

While some existing 6DOF cameras may fix several of the issues with 3DOF mentioned above, they have other problems. Arrays of many cameras can produce a large amount of data, which is expensive to store and process. These camera systems are large and heavy, so they are difficult to transport, particularly to remote locations. Arrays of many cameras are not always reliable (sometimes one or more cameras fails to capture video data, which can interfere with normal operation). Setting up these large cameras is time consuming, so it may be difficult to record spontaneous moments.

With all of the ODS, VR180, and 6DOF VR video formats and camera systems discussed herein, common knowledge in this field is that if the camera recording the video moves by accelerating or rotating, it may cause the viewer to experience motion sickness when watched in VR, due to vestibulo-ocular conflict. Vestibulo-ocular conflict happens when the viewer's eyes and inner ear provide conflicting information about motion of the viewer's head. For example, if the recording camera accelerates and the viewer watches this video without moving, their eyes will perceive motion but their inner ear will not, which creates a conflict. Because of this effect, most VR videos in ODS, VR180 or 6DOF varieties do not include camera motion, or only move the camera in a straight line at constant speed. This is a significant limitation on what can be done with VR cameras. For example, Snap Spectacles 3 could record VR180 format video while the wearer of their glasses is moving their head, but watching this video in VR is likely to cause motion sickness due to vestibulo-ocular conflict.

Vestibulo-ocular conflict can also be caused by any of the above formats if the video is not rotated so that gravity is aligned properly and the horizon is level, but many VR cameras do not address this problem. Therefore, if the video is recorded while the camera is not level, the resulting video can cause discomfort in VR similar to motion sickness.

With the exception of VR camera systems that are wearable (such as some GoPros or Snap Spectacles 3), many of the available VR camera systems consist of a camera array mounted on a tripod. The resulting raw video footage includes the tripod. In some cases, the stitching software may attempt to obscure the tripod by warping the image near it, or replace it with alternative imagery such as a color gradient, a "plate" captured by a different camera, or a logo. All of these approaches to removing the tripod produce an imperfect result for the viewer in VR, which reduces immersion and presence. If a viewer looks down while watching a video in VR, they usually do not see a body; instead, they see a tripod or the ground, which gives the feeling of being a floating disembodied pair of eyes.

Overall, there are many inconveniences for VR video creators, and technical problems for VR video viewers that reduce immersion and presence, or cause discomfort from incorrect imagery or vestibulo-ocular conflict. The systems and methods discussed herein help to overcome the above-mentioned disadvantages.

In some embodiments, the described systems and methods support the recording of 6DOF 3D videos and replaying them in VR. The systems and methods enable capture of 6DOF 3D videos where the camera is moving (e.g., when attached to a user, a drone, or the like), and replaying such videos in VR without causing motion sickness, by minimizing vestibulo-ocular conflict. In a particular embodiment, the system includes a pair of glasses or other wearable camera(s) which records 6DOF 3D video from the wearer's first-person perspective. The described systems and methods enable watching such a video comfortably in VR, which creates a feeling of reliving the recorded experience.

FIG. 1 is a block diagram illustrating an environment 100 within which an example embodiment may be implemented. As shown in FIG. 1, a camera system 102, a virtual reality system 104, a rendering system 106, and a data storage manager 108 are coupled to a data communication network 112. In other implementations, any of camera system 102, virtual reality system 104, rendering system 106, and data storage manager 108 may be coupled to one another. Additionally, a data storage device 110 may be coupled to data storage manager 108.

Camera system 102 may capture image and audio data as discussed herein. Virtual reality system 104 may decompress and render data for presentation to a VR device or system as discussed herein. Rendering system 106 may perform motion estimation, 3D scene reconstruction, and image rendering as discussed herein. Data storage manager 108 may receive and store various data generated by and used in environment 100. For example, data storage manager 108 may store data to (and retrieve data from) data storage device 110.

In some embodiments, data communication network 112 may include any type of wired or wireless network, such as a local area network, a wide area network, the Internet, a cellular communication network, a Bluetooth low energy network, WiFi network, or NFC wireless connection or any combination of two or more data communication networks. In some implementations, data communication network 112 includes a data communication bus.

As shown in FIG. 1, environment 100 also includes a server 114 and one or more remote systems 116, such as remote servers or other remote processing systems. Server 114 and/or remote systems 116 are useful in situations requiring live processing or remote processing. For example, if the user runs a stitching software on their own personal computer, a remote system is not needed. In another situation, the user may upload their data to server 114 and the stitching is performed on server 114. In other implementations, camera system 102 may stream its raw or partially processed video and other sensor data to server 114 or remote system 116 for further processing into a suitable 6DOF format. Server 114 or remote system 116 may then rebroadcast the processed data to one or more other viewers. For example, when livestreaming a live event (e.g., a sporting event) or when streaming from a pair of AR glasses. The AR glasses may not have sufficient computing resources to perform the 6DOF processing, so it is more practical to send that data to server 114 or remote system 116 for live processing.

Figure 2:
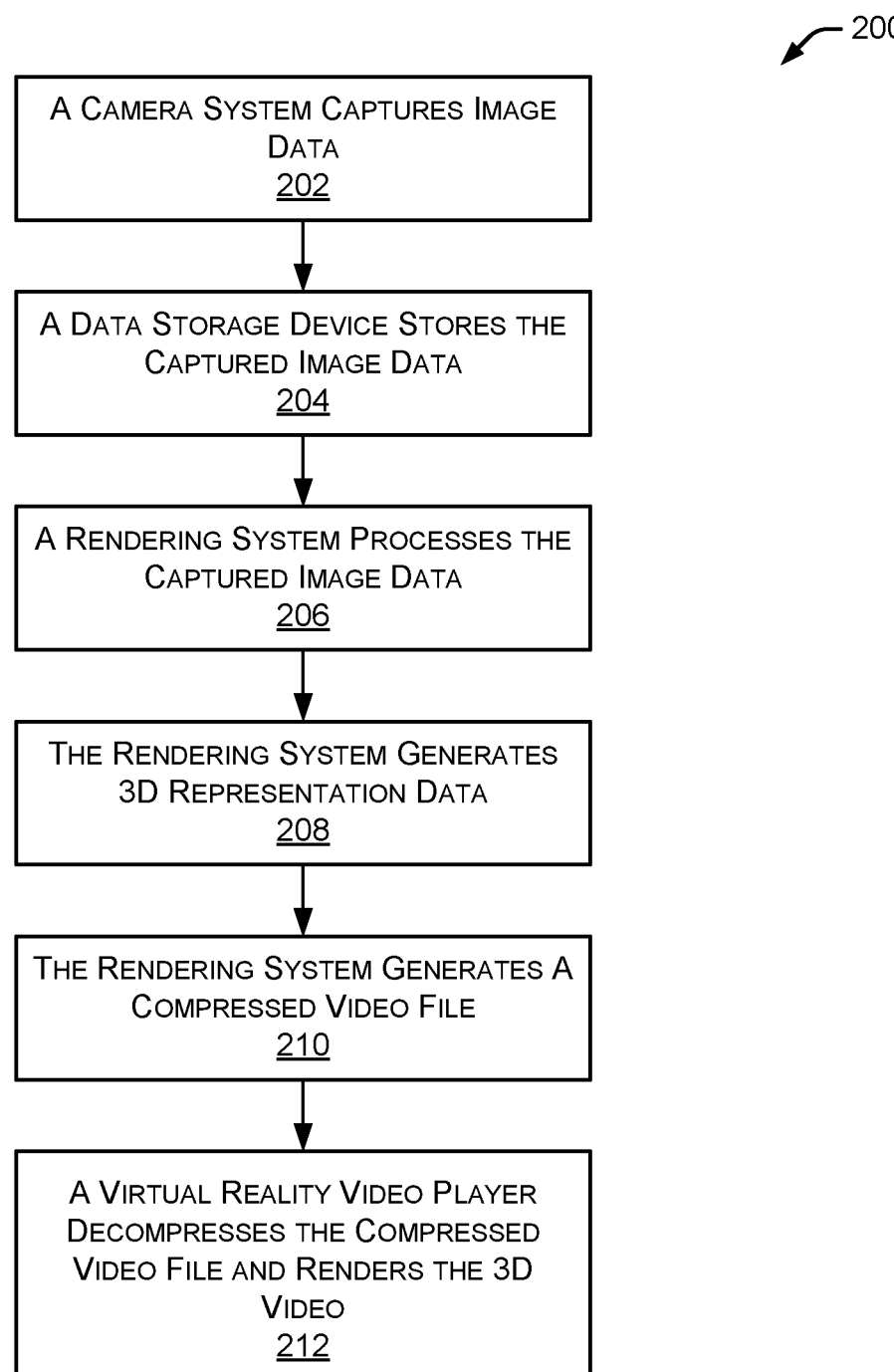
FIG. 2 is a flow diagram illustrating an embodiment of a process for processing and rendering image data.

FIG. 2 is a flow diagram illustrating an embodiment of a process 200 for processing and rendering image data. Initially, a camera system captures 202 image data using one or more cameras. A data storage device stores 204 the captured image data. A rendering system then processes 206 the captured image data and generates 208 3D representation data. The rendering system also generates 210 a compressed video file. A virtual reality video player decompresses 212 the compressed video file and renders the 3D video for one or more users of the virtual reality video player.

As discussed herein, the camera components used in the described systems and methods may record captured data to long-term storage media, such as an SSD or microSD card. The rendering system can estimate the motion of the sensors (e.g., cameras) in an external coordinate frame, generate a 3D representation of the scene that varies in time, and then render that representation into a compressed video file while minimizing vestibulo-ocular conflict. In some embodiments, a VR video player component decompresses the video file and renders the 3D video for a user in a way that responds to their movement while wearing a head-mounted display.

Figure 3:
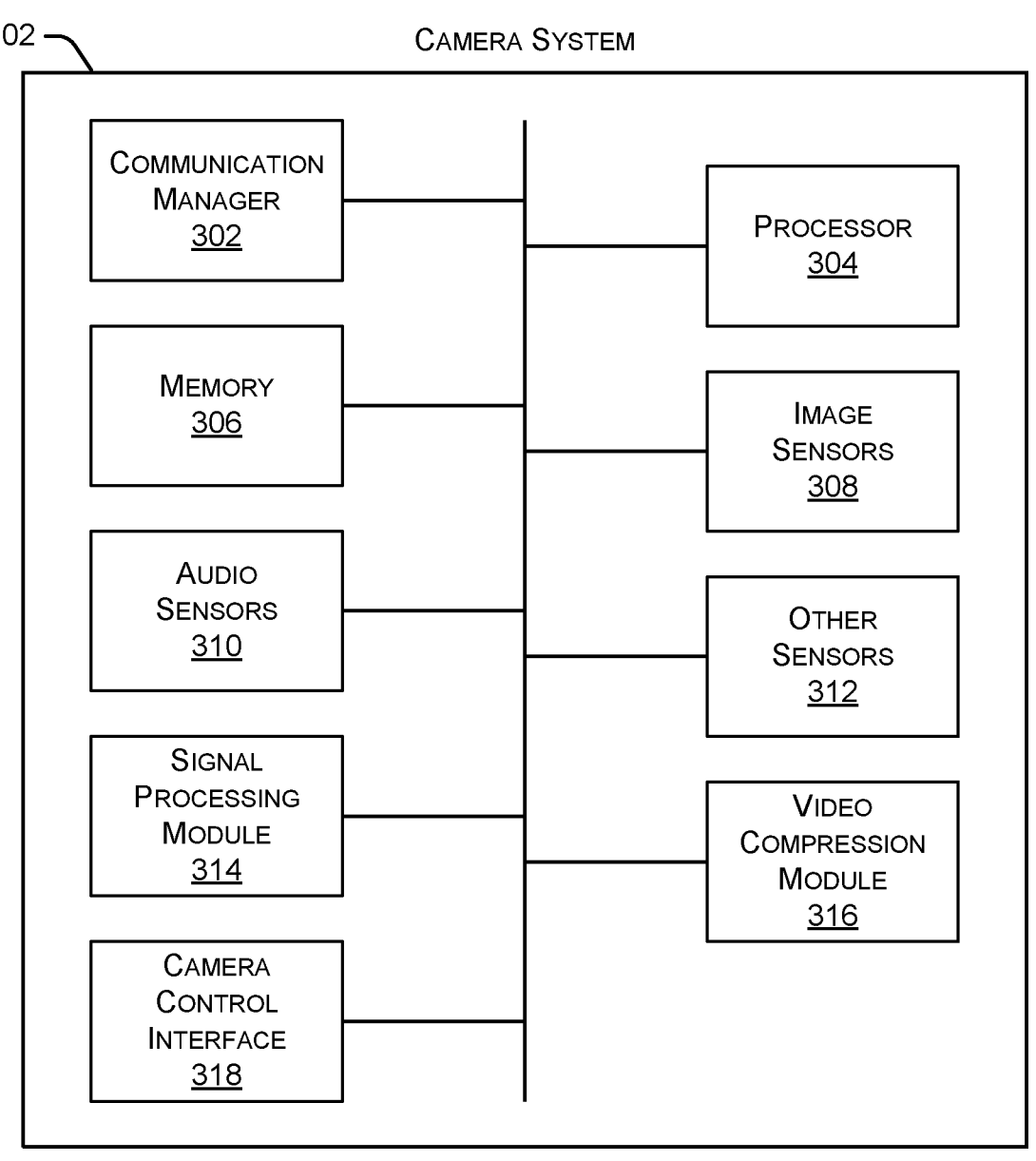
FIG. 3 is a block diagram illustrating an embodiment of a camera system.

FIG. 3 is a block diagram illustrating an embodiment of camera system 102. As shown in FIG. 3, camera system 102 includes a communication manager 302, a processor 304, and a memory 306. Communication manager 302 allows camera system 102 to communicate with other systems and components. Processor 304 executes various instructions to perform the functionality provided by camera system 102, as discussed herein. Memory 306 stores these instructions as well as other data used by processor 304 and other modules and components contained in camera system 102.

Additionally, camera system 102 includes one or more image sensors 308 that capture various images and image-related data. In some embodiments, camera system 102 also includes one or more audio sensors 310 that capture audio data that corresponds to the image data. Camera system 102 may further include one or more other sensors 312 that capture data that corresponds to the image data. In some implementations, other sensors 312 may include inertial measurement units (IMUs), microphones, and any other sensors that are useful for 3D scanning or estimation of motion, or for transmitting data to a computer with long-term storage media. For example, a computer with long-term storage media may apply some processing to the raw sensor data before storing it, such as image signal processing or video compression.

In some implementations, camera system 102 may include a signal processing module 314 that provides various video, image, or audio processing of the data captured by image sensors 308, audio sensors 310, other sensors 312, and the like.

Camera system 102 may further include a video compression module 316 that compresses, for example, video data captured by image sensors 308. Additionally, camera system 102 may include a camera control interface 318 that provides the capability to start recording, stop recording, inspect the current state of camera system 102, and preview the recorded video.

In some embodiments, the sensors 308, 310, and 312, the computer, the long-term storage media, and the camera control interface 318 may be part of a common device, such as a pair of wearable glasses. In other embodiments, the sensors 308, 310, and 312, the computer, the long-term storage media, and the camera control interface 318 may be separated into different devices or components that communicate with one another (e.g., wirelessly, with connecting cables, etc.).

In some embodiments, camera system 102 is a standalone product used for the purpose of recording photos and videos. In other embodiments, camera system 102 is incorporated into a pair of augmented reality glasses and may share sensors used for other purposes by the augmented reality glasses. The augmented reality glasses can perform multiple functions while leveraging the camera hardware components while operating in a video or photo capture mode.

Figure 4:
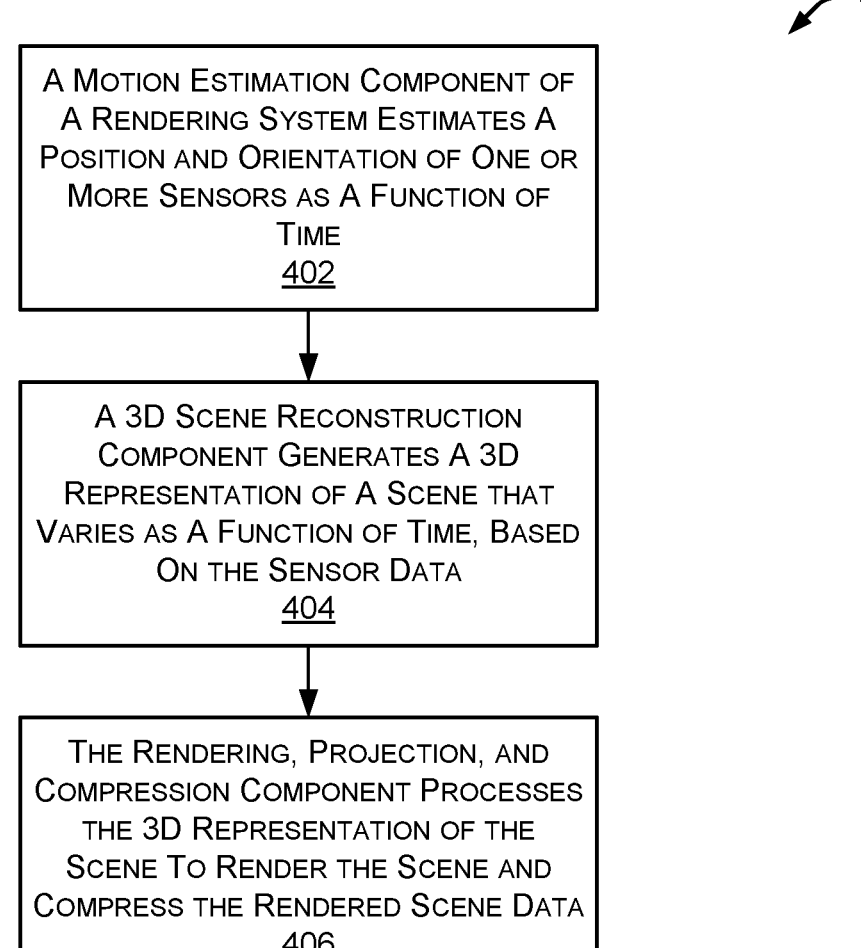
FIG. 4 is a flow diagram illustrating an embodiment of a process for rendering image data.

FIG. 4 is a flow diagram illustrating an embodiment of a process 400 for rendering image data. Initially, a motion estimation component of a rendering system estimates 402 a position and orientation of one or more sensors as a function of time. A 3D scene reconstruction component generates 404 a 3D representation of a scene that varies as a function of time based on the sensor data. The rendering, projection, and compression component processes 406 the 3D representation of the scene to render the scene and compress the rendered scene data.

Figure 5:
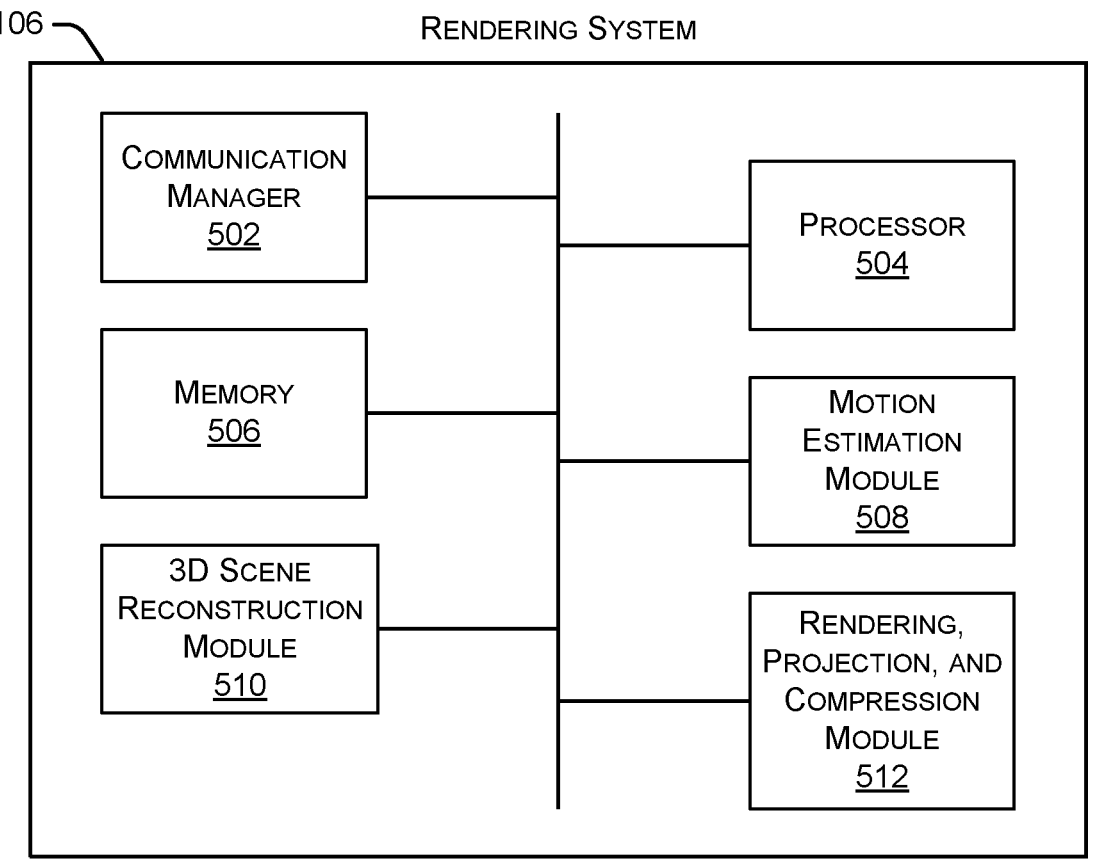
FIG. 5 is a block diagram illustrating an embodiment of a rendering system.

FIG. 5 is a block diagram illustrating an embodiment of rendering system 106. As shown in FIG. 5, rendering system 106 includes a communication manager 502, a processor 504, and a memory 506. Communication manager 502 allows rendering system 106 to communicate with other systems and components. Processor 504 executes various instructions to perform the functionality provided by rendering system 106, as discussed herein. Memory 506 stores these instructions as well as other data used by processor 504 and other modules and components contained in rendering system 106.

Additionally, rendering system 106 includes a motion estimation module 508, a 3D scene reconstruction module 510, and a rendering, projection, and compression module 512. Motion estimation module 508 estimates the position and orientation of one or more sensors as a function of time over the duration of a recording relative to an external coordinate frame. 3D scene reconstruction module 510 builds a 3D representation of the scene that varies as a function of time, using the sensor data. Rendering, projection, and compression module 512 further processes the 3D representation of the scene to render it from a position and orientation that may differ from the original real cameras (e.g., alternative projections), in any suitable projection (e.g., equirectangular or cubemap), and compress it in any suitable file format, such as h264, h265, mp4, mov, avi, and the like. Rendering, projection, and compression module 512 may also represent a scene from virtual cameras to minimize vestibulo-ocular conflict. In some embodiments, the virtual camera positions and directions are modified so they are close to the original camera trajectory, but the virtual camera trajectory has less or zero acceleration and rotation, which minimizes vestibulo-ocular conflict.

In some embodiments, a 3D scene representation is rotated so that it is aligned with gravity by using data from inertial sensors and visual inertial odometry, which also contributes to minimizing vestibulo-ocular conflict.

In some embodiments, motion estimation module 508 uses techniques known as visual inertial odometry, which combines data from one or more cameras and one or more IMUs. In particular embodiments, IMUs are not involved. Instead, the method of visual odometry is used with one or more cameras. In some embodiments, visual odometry or visual inertial odometry is used in conjunction with wide or fisheye lenses. In some implementations, an IMU is used without a camera. In these implementations, the sensor may be referred to as an inertial navigation system (INS) or attitude heading reference system (AHRS). Internally, the sensor may use sensor fusion (e.g., Bayesian filtering) to combine data from accelerometers, gyroscopes, magnetometers, GPS, barometers, and the like to produce an estimate of the pose, position and/or velocity of the sensor.

In some embodiments, 3D scene reconstruction module 510 receives images from one more cameras at one or more moments in time, and possibly other sensors relevant to 3D scanning (e.g., lidar or structured light cameras). The received images and other data are combined to form a 3D representation of the scene that varies with time (i.e., a 3D movie). In some embodiments, the method of constructing a 3D scene representation consists of applying multi-view stereo methods for depth estimation to the images that are captured. In particular implementations, a neural network may perform the 3D depth estimation, or represents the 3D scene implicitly (for example, neural radiance fields or sinusoidal representation networks) or represent the scene in another way suitable for 6DOF rendering (e.g., multi-plane or multi-sphere images, or layered-depth images). In some examples, the 3D scene reconstruction methods are used with wide/fisheye lenses.

In some embodiments, motion estimation module 508 and 3D scene reconstruction module 510 handle the issue when one or more sensors are not rigidly connected (e.g., they could be on a pair of flexible glasses), and therefore their pose relative to each other could change as a function of time. In one such embodiment, the pose of such cameras are estimated jointly with other parameters during visual inertial odometry. For example, the images from two cameras may be rectified to an epipolar or spherical epipolar projection, then disparity is computed between the two rectified images to obtain a depth map. In particular implementations, optical flow replaces disparity in order to be more robust to non-rigidly connected cameras on a flexible structure. In some examples, optical flow is computed using a neural network or differentiable computing framework such as TensorFlow or PyTorch.

In some embodiments, 3D scene reconstruction module 510 may leverage calibration of the camera and other sensors obtained through special processes prior to normal operation of the camera. Such processes are typically called "calibration" in the fields of computer vision and robotics. In some embodiments, cameras and IMUS are calibrated to determine their intrinsic parameters (which represent distortion) and extrinsic parameters (which represent the relative pose between the sensors). These parameters can be estimated under controlled conditions, such as with the aid of calibration targets with fiducial markers.

In some embodiments, the rendering software component runs on separate computer hardware from camera system 102 (e.g., a laptop, desktop, or server). In some examples, the rendering software component runs on a computer that is part of camera system 102, so the resulting compressed video file is generated on the same device. In some embodiments, rendering system 106 runs in real time, which enables live transmission of a compressed 3D video stream, which is transmitted to other computers over a wireless or cellular network.

Figure 6:
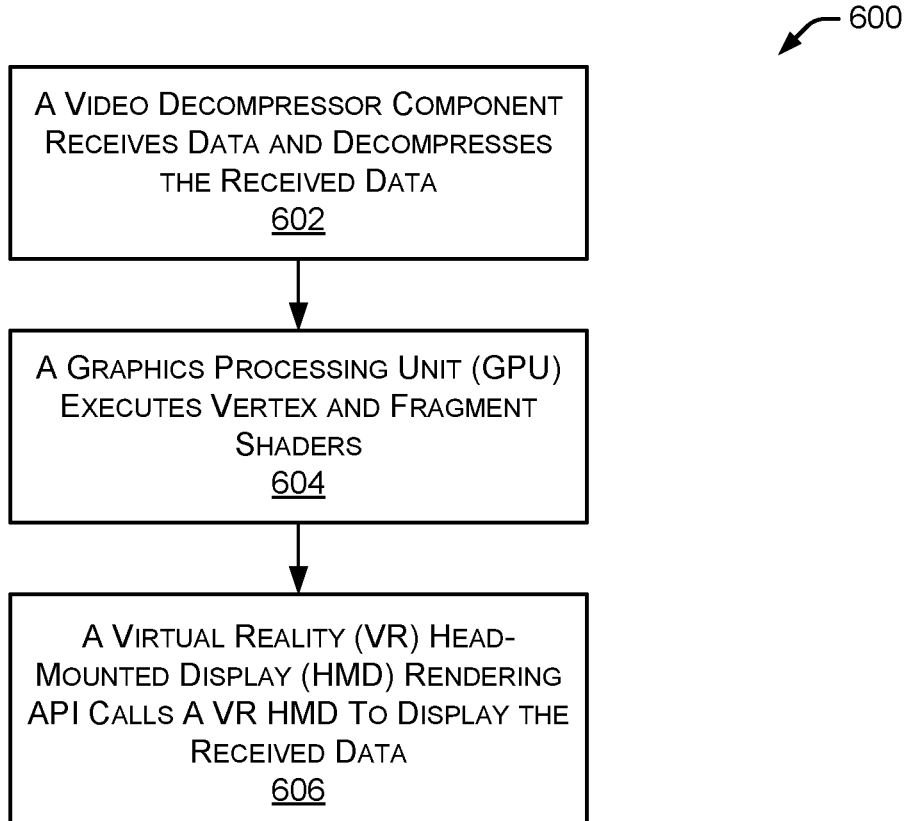
FIG. 6 is a flow diagram illustrating an embodiment of a process for rendering virtuality reality data.

FIG. 6 is a flow diagram illustrating an embodiment of a process 600 for rendering virtuality reality data. Initially, a video decompressor component receives 602 data and decompresses the received data. Next, a graphics processing unit (GPU) executes 604 vertex and fragment shaders. Finally, a virtual reality head-mounted display rendering application programming interface (API) calls 606 a virtual reality head-mounted display to display the received data.

Figure 7:
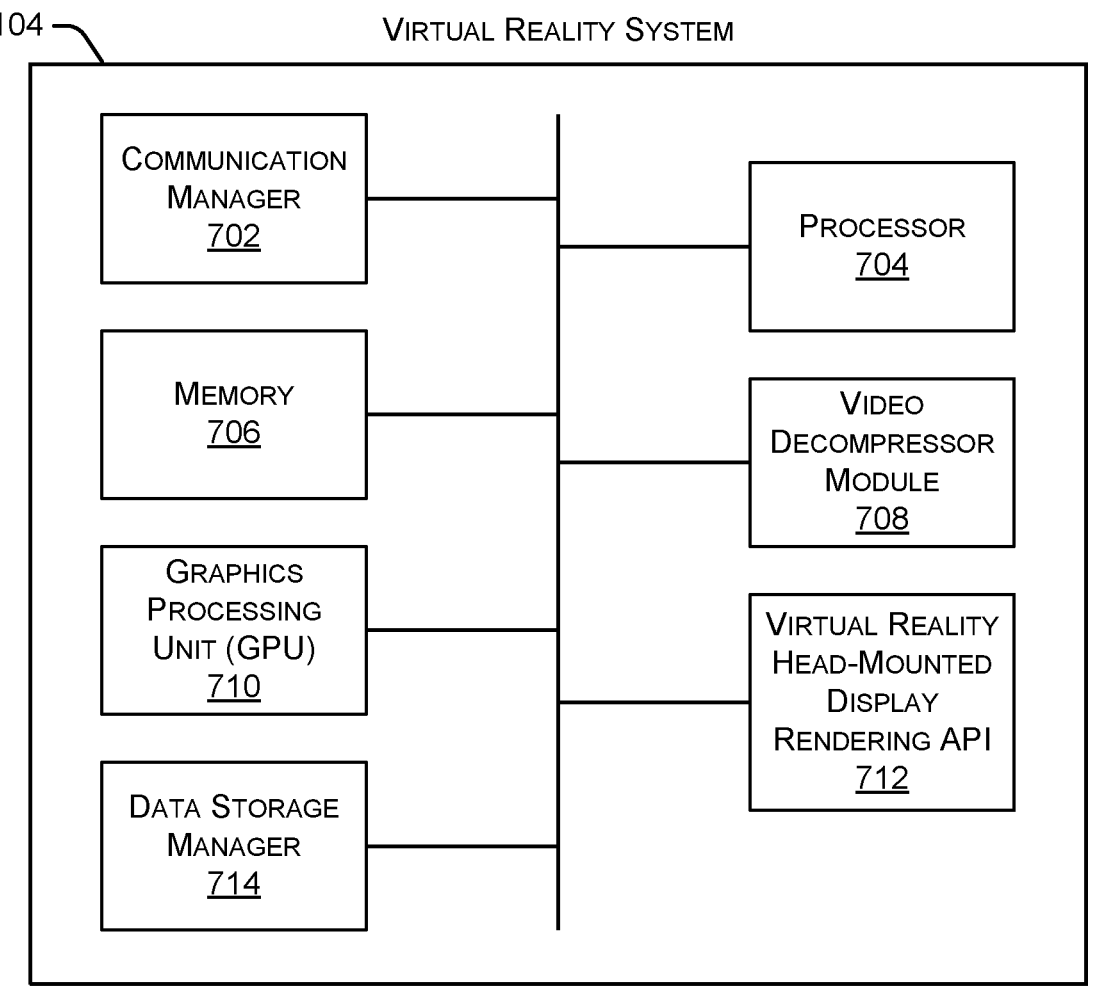
FIG. 7 is a block diagram illustrating an embodiment of a virtual reality system.

FIG. 7 is a block diagram illustrating an embodiment of virtual reality system 104. As shown in FIG. 7 virtual reality system 104 includes a communication manager 702, a processor 704, and a memory 706. Communication manager 702 allows virtual reality system 104 to communicate with other systems and components. Processor 704 executes various instructions to perform the functionality provided by virtual reality system 104, as discussed herein. Memory 706 stores these instructions as well as other data used by processor 704 and other modules and components contained in a virtual reality system 104.

Additionally, virtual reality system 104 includes a video decompressor module 708, a graphics processing unit (GPU) 710, and a virtual reality head-mounted display rendering API 712. Video decompressor module 708 decompresses received video data that has been previously compressed. Graphics processing unit (GPU) 710 performs various graphics operations, as discussed herein. Virtual reality head-mounted display rendering API 712 may render an image to be displayed to the viewer's left and right eyes.

In some embodiments, virtual reality system 104 includes a software application or web page that can be viewed in a VR head-mounted display, which decodes a compressed video and renders the 3D scene so that the user can watch the video. In some implementations, virtual reality system 104 reads a video file or video stream over a network, and/or decompresses frames of video data to a texture in the memory of GPU 710, and possibly additional meta-data such as camera poses or lens distortion parameters. The texture and metadata is accessible to vertex and fragment shader code which executes on GPU 710. The vertex and fragment shader code transforms the texture and meta data into 3D geometry or any other representation suitable for 3D rendering or novel-view synthesis. The vertex and fragment shader code are specified along with additional geometry and commands to VR HMD rendering API 712, which renders the image to be displayed to the viewer's left and right eyes. In some embodiments, virtual reality system 104 accesses tracking information from the VR HMD about the motion of the HMD, and the virtual reality system 104 uses this information to render images that respond correctly to both translation and rotation (i.e., 6DOF).

As discussed herein, a shader is a specialized program for graphics processing that may execute on a GPU, in parallel. There are two main types of shaders: vertex shaders and fragment shaders. Vertex shaders may execute once per vertex (in parallel). Fragment shaders may execute once per fragment (in parallel). In some embodiments, a shader may run on a CPU. Some shaders are written in a shader programming language such as OpenGL Shading Language (GLSL) or High-Level Shader Language (HLSL).

FIG. 8 is a flow diagram illustrating an embodiment of a process 800 for presenting virtual reality videos to a user. Initially, a camera captures 802 6DOF 3D videos while the camera is in motion. A rendering system coupled to the camera then renders 804 the 6DOF 3D videos while reducing or minimizing vestibulo-ocular conflict. Finally, a virtual reality system coupled to the rendering system presents 806 the 6DOF 3D videos to a user of the virtual reality system.

FIG. 9 is a flow diagram illustrating an embodiment of a process 900 for reducing or eliminating vestibulo-ocular conflict. Initially, a rendering system estimates 902 an orientation of a camera relative to a gravity-aligned coordinate frame. The rendering system then adjusts 904 a rotation of a rendered 6DOF 3D video, based on the estimated orientation of gravity, to maintain a level horizon. The human brain visually estimates the direction of gravity when it sees a horizon. Adjusting a rotation of the 6DOF 3D video, based on the estimated orientation of gravity, maintains a level horizon, which may help reduce or eliminate vestibulo-ocular conflict.

Process 900 continues as the rendering system uses its estimated pose of the camera to eliminate 906 all rotation associated with the camera such that the user only sees rotation that is created by the user's own motion. In some situations, when a user rotates their head, the view that the user sees needs to change. However, if the user is not rotating their head, but the image does rotate, this causes confusion and possibly vestibulo-ocular conflict. By eliminating the rotation associated with the camera, the user will only see the rotation caused by the user themselves.

In some embodiments, steps 902, 904, and 906 may be performed with 6DOF or with other 2D formats.

The rendering system may create 908 a virtual camera that travels along a trajectory with multiple straight segments with no acceleration. Alternatively, the virtual camera may travel along any trajectory that minimizes vestibulo-ocular conflict. In some embodiments, the virtual camera may instantaneously transition between the multiple straight segments when rendering the video. In some embodiments, step 908 is performed with 6DOF.

The virtual camera path with multiple straight segments eliminates the non-linear path followed by a moving camera. The non-linear path typically includes acceleration. The multiple straight segments are followed at constant velocities to avoid acceleration. This approach may help reduce or eliminate vestibulo-ocular conflict.

For example, various systems and methods may be used to move a virtual camera in a way that minimizes vestibulo-ocular conflict and creates a pleasing experience for the viewer. To minimize vestibulo-ocular conflict, it is desirable to approximate the original camera trajectory with a sequence of straight lines and travel at a constant velocity along each line, while changing velocity instantaneously at the transition between two straight lines. In some embodiments, each straight line may represent a particular period of time. In other embodiments, multiple straight lines may represent different periods of time. In particular implementations, if the camera doesn't move more than a threshold distance (e.g., a few inches) during a period of time, then the period of time may be represented as a single point at the center of mass of the camera. This may be referred to as "dwell behavior."

In some situations, other types of virtual camera movements may also minimize vestibulo-ocular conflict. For example, suppose a user is wearing VR glasses and the user is primarily standing still but slightly swaying, then later the user starts walking forward and bouncing up and down. For the first part (primarily standing still), the virtual camera may remain still and stay at a point near where the original camera was for the entire duration of the user primarily standing still. Thus, rather than constantly adjusting the video for the user swaying back and forth, the video remains still. Then, when the user begins walking forward and bouncing, the systems and methods may produce a single straight line (from start to finish) instead of multiple smaller lines that create a bouncy trajectory. This approach eliminates the bouncy trajectory by smoothing it with a single straight line, which may provide a more pleasant experience for the user.

In some embodiments, the described systems and methods may want to perform a rotation as one or more large "jumps." For example, if the original camera is making a significant rotation, such as 90, 180, or 360 degrees, the virtual camera may perform one or more jumps, such as 15 degree jumps or 30 degree jumps. If the original camera is making a 180 degree rotation, the systems and methods may perform six 30 degree jumps. These jumps may be perceived differently by the user than a continuous rotation, which may reduce vestibulo-ocular conflict.

Figure 10:
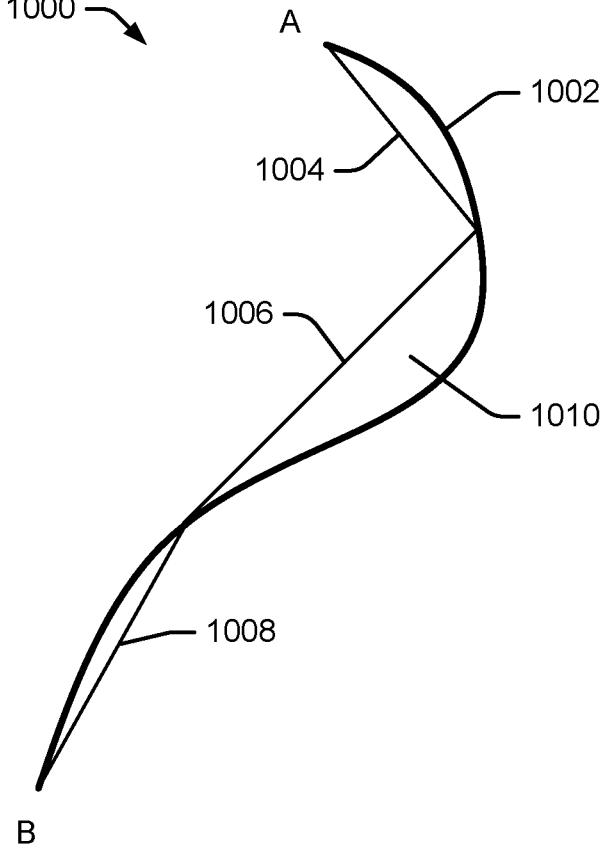
FIG. 10 illustrates an example embodiment of a real camera trajectory and a virtual camera trajectory.

FIG. 10 illustrates an example embodiment 1000 of a real camera trajectory and a virtual camera trajectory. In many situations, the virtual camera may be in a different position than the real camera. As discussed herein, a virtual camera may move along a different trajectory than a real camera. In the example of FIG. 10, a curved line 1002 represents the trajectory of a real camera moving in the real world from point A to point B. Additionally, three straight lines 1004, 1006, and 1008 represent the virtual camera trajectory. In the virtual reality system, the virtual camera trajectory will be used as the perspective for rendering the scene. As shown in FIG. 10, an offset 1010 is present between the curved line 1002 and the straight lines 1004-1008. The magnitude of offset 1010 varies at different points of the trajectories.

Figure 11:
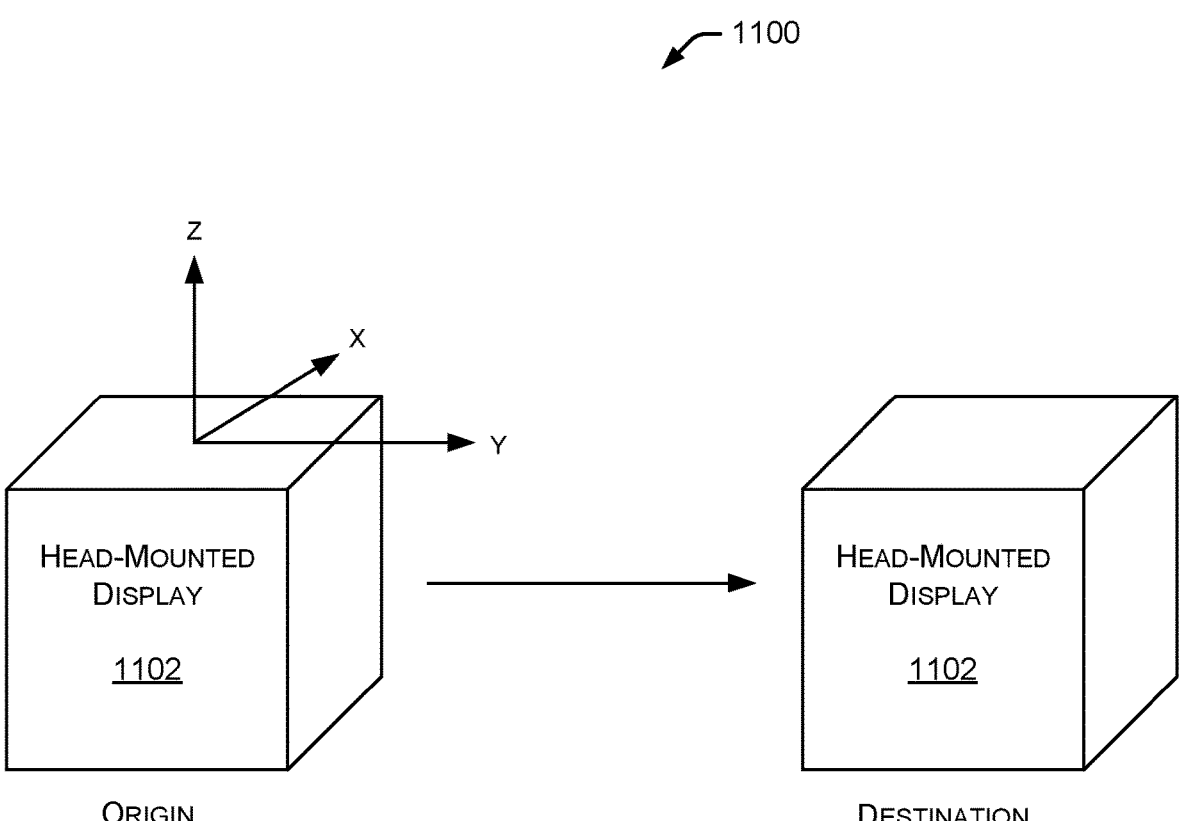
FIG. 11 illustrates an example embodiment head-mounted display moving from an origin location to a destination.

FIG. 11 illustrates an example embodiment 1100 of a head-mounted display 1102 moving from an origin location to a destination. As shown in FIG. 11, head-mounted display 1102 has x, y, and z coordinates in an operating environment. When head-mounted display 1102 moves from the origin location to the destination, the systems and methods described herein need to properly render the scene associated with head-mounted display 1102 at the destination. To do so, it needs to transform (translate and rotate) the 6DOF representation of the scene (which may originally be computed in the coordinate frame of the real cameras, or some other useful coordinate frame). This transform is determined by 1) the pose of the head-mounted display relative to the origin of its tracking system, 2) the offset between the real camera and the virtual camera as described herein, and 3) any rotation between the 6DOF representation and the destination relevant to minimizing vestibulo-ocular conflict (such as correcting the horizon, or eliminating yaw from original camera).

The systems and methods discussed herein may be used with a camera that is associated with any type of device and can move in any direction. For example, the camera may be associated with a wearable device, a helmet, a hat, an article of clothing, a drone, a robotic system, an unmanned aerial vehicle (UAV), and the like. A robotic system can include any type of system capable of moving that includes a camera and/or other types of sensors.

Figure 12:
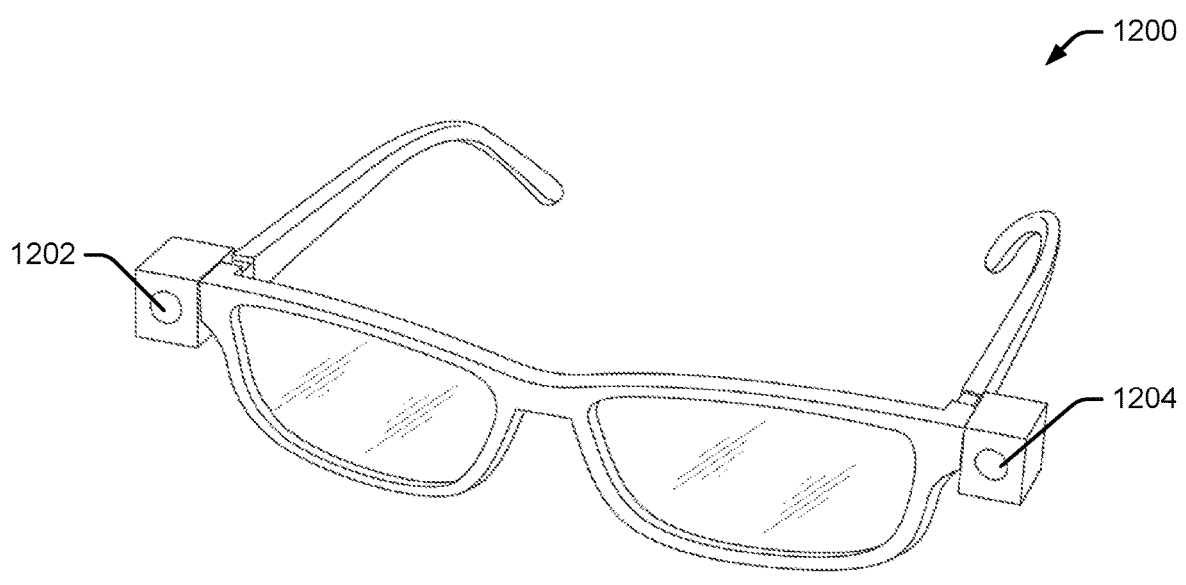
FIG. 12 illustrates an example embodiment of a pair of glasses that include multiple cameras.

FIG. 12 illustrates an example embodiment 1200 of a pair of glasses that include multiple cameras 1202 and 1204. In the example of FIG. 12, the cameras 1202 and 1204 are wide/fisheye lenses. In some embodiments, the glasses shown in FIG. 12 may also include other sensors, such as IMUs or microphones.

Figure 13:
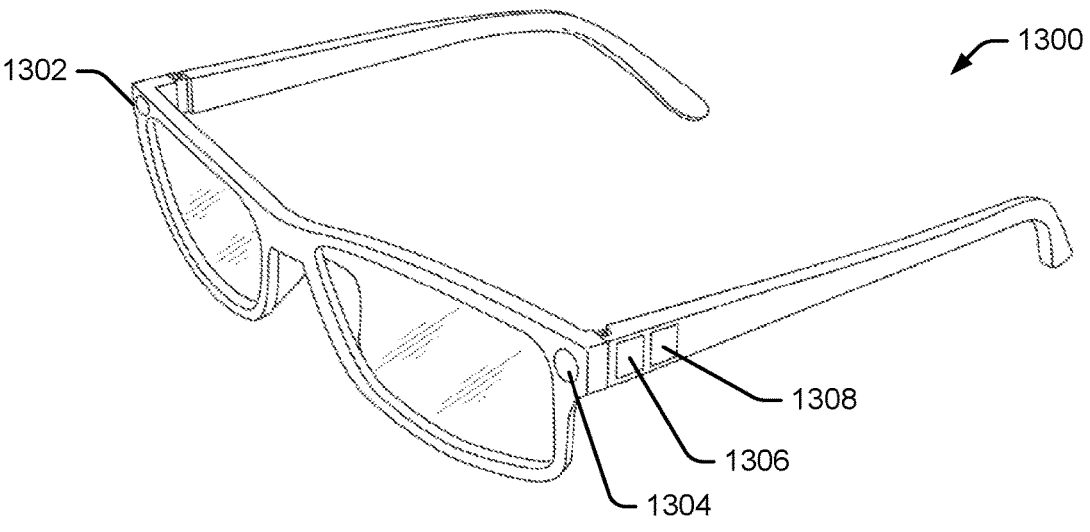
FIG. 13 illustrates an example embodiment of a pair of glasses that include multiple cameras and multiple user interface buttons to control operation of the cameras.

FIG. 13 illustrates an example embodiment 1300 of a pair of glasses that include multiple cameras 1302 and 1304, and multiple user interface buttons 1306 and 1308 to control operation of the cameras. In other embodiments, user interface buttons 1306 and 1308 may control the operation of any other sensor, device, and the like.

Figure 14:
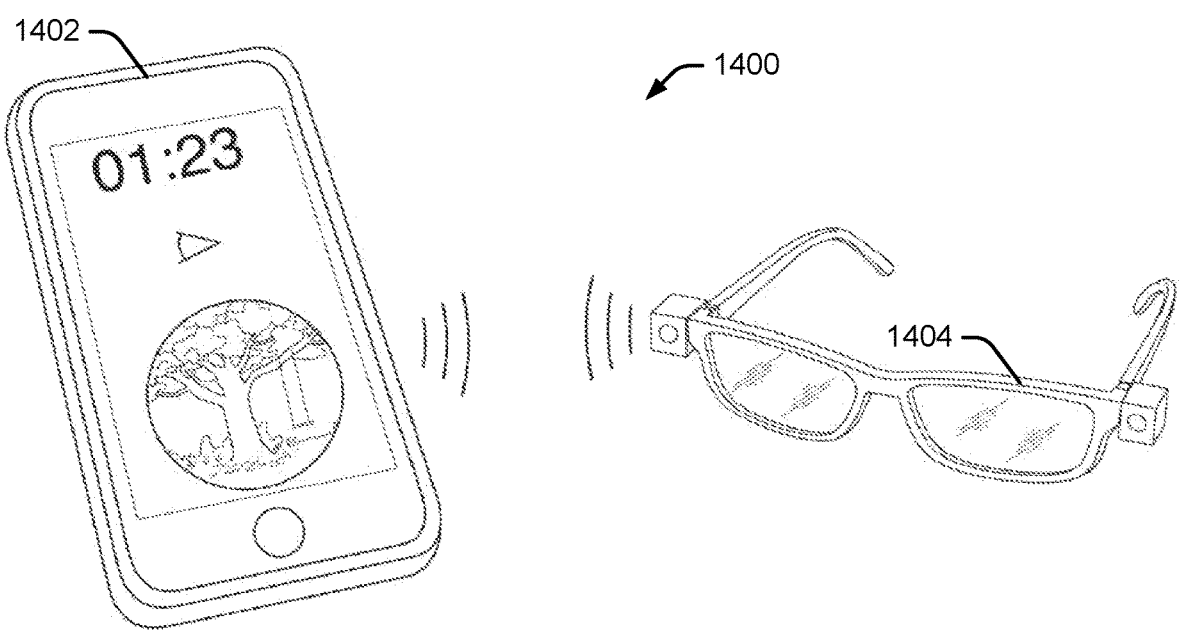
FIG. 14 illustrates an example embodiment of a pair of glasses that include multiple cameras that can be controlled by a user interface application.

FIG. 14 illustrates an example embodiment 1400 of a pair of glasses 1404 that include multiple cameras that can be controlled by a user interface application executing on a computing device 1402. In some embodiments, computing device 1402 may be a smart phone, tablet, laptop, computer, and the like. Computing device 1402 may also communicate with other computing systems, servers, storage systems, and the like. In some implementations, the user interface application may display data such as the duration of a recording, previews of the video being captured, and buttons or other controls to start and stop recording or manage previously recorded videos.

Figure 15:
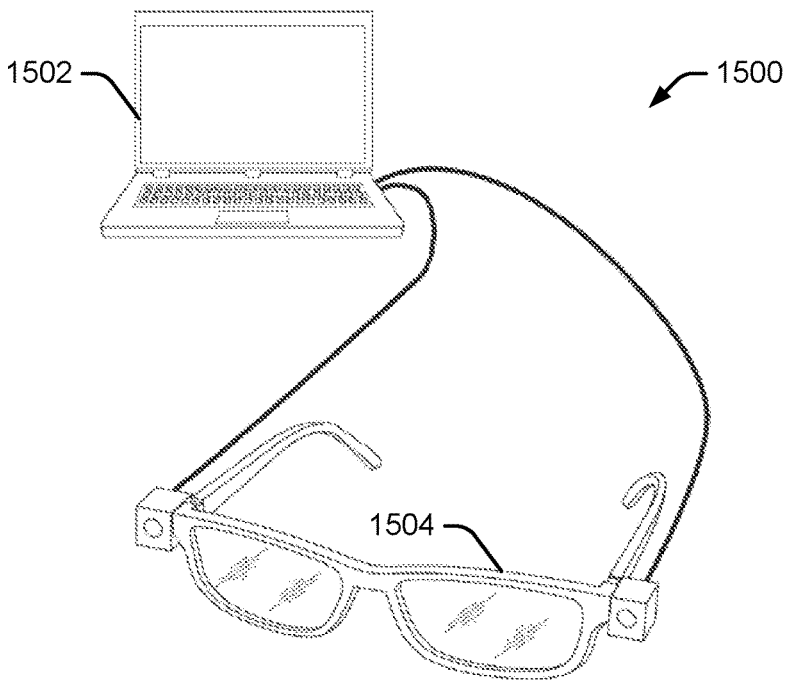
FIG. 15 illustrates an example embodiment of a pair of glasses that include multiple cameras, where the glasses are coupled to a computing device.

FIG. 15 illustrates an example embodiment 1500 of a pair of glasses 1504 that include multiple cameras, where the glasses are coupled to a computing device 1502. In some embodiments, computing device 1502 may be an external computer with long-term storage media. In particular implementations, computing device 1502 may provide power to cameras and other sensors on glasses 1504. In other embodiments, the long-term storage media and power supply may be part of glasses 1504.

Figure 16:
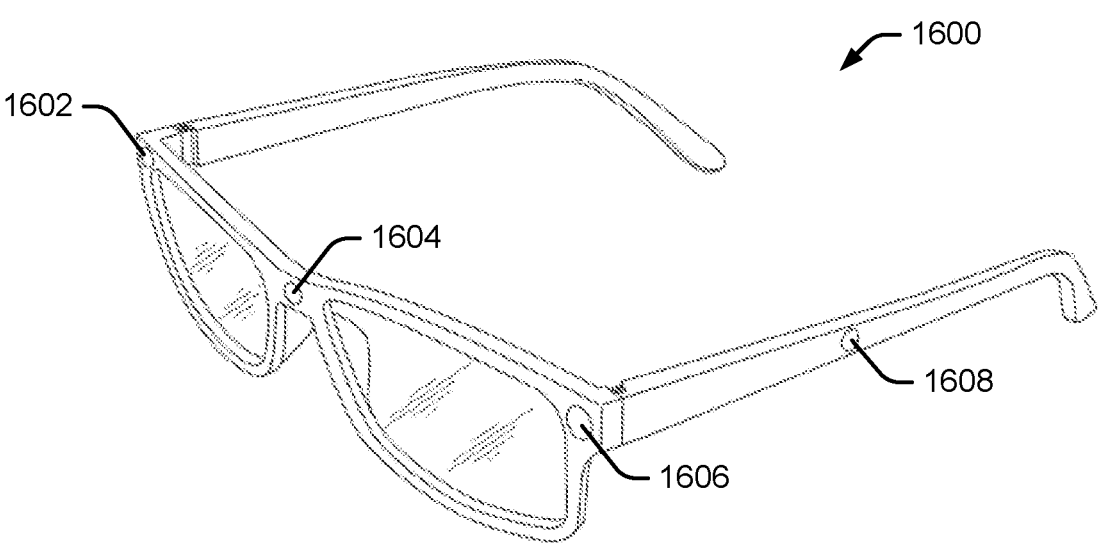
FIG. 16 illustrates an example embodiment of a pair of glasses that include multiple cameras and other types of sensors.

FIG. 16 illustrates an example embodiment 1600 of a pair of glasses that include multiple cameras 1602 and 1606 and other types of sensors 1604 and 1608. For example, sensors 1604 and 1608 may include one or more cameras, microphones, accelerometers, gyroscopes, magnetometers, barometers, GPS sensors, lidar, structured light projectors combined with cameras with polarized filters, visible light sources (e.g., flashlight or headlamp), sonar, ultrasonic sensors, radar, piezoelectric sensors, force-torque sensors to estimate flex in the glasses frames, and the like.

Figure 17:
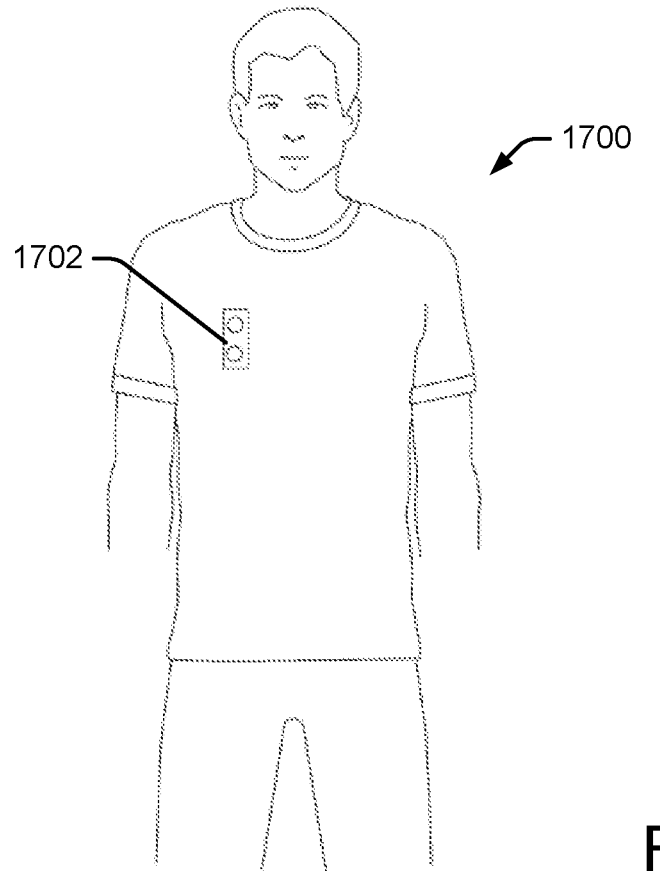
FIG. 17 illustrates an example embodiment of a camera worn by a user on their body or clothing.

FIG. 17 illustrates an example embodiment 1700 of a camera 1702 worn by a user on their body or clothing.

Figure 18:
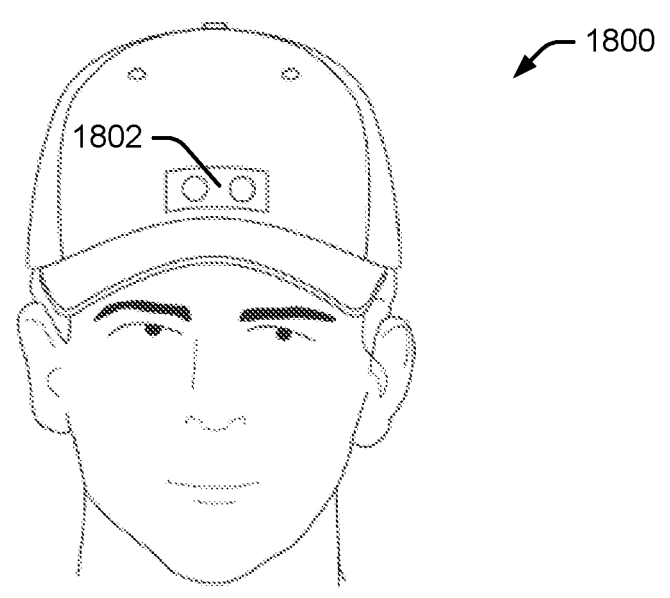
FIG. 18 illustrates an example embodiment of multiple cameras mounted to a hat, helmet, or other wearable item.

FIG. 18 illustrates an example embodiment 1800 of multiple cameras 1802 mounted to a hat, helmet, or other wearable item.

Figure 19:
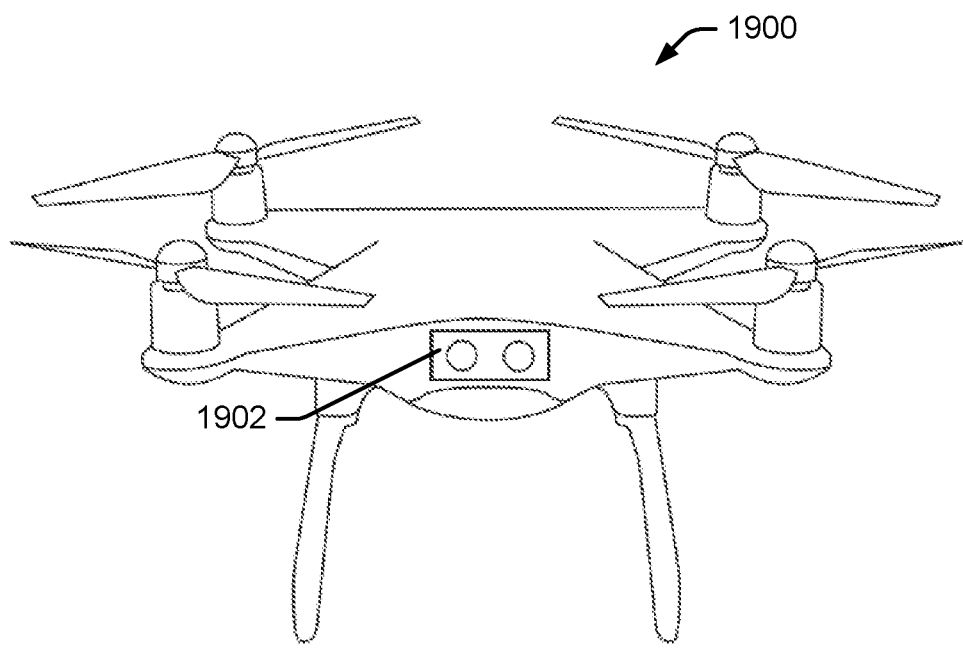
FIG. 19 illustrates an example embodiment of an unmanned aerial vehicle (UAV) that includes multiple attached cameras.

FIG. 19 illustrates an example embodiment 1900 of an unmanned aerial vehicle (UAV) that includes multiple attached cameras 1902. In some embodiments, any number of cameras 1902 may be attached to the UAV at different locations on the UAV to capture multiple perspectives simultaneously.

Figure 20:
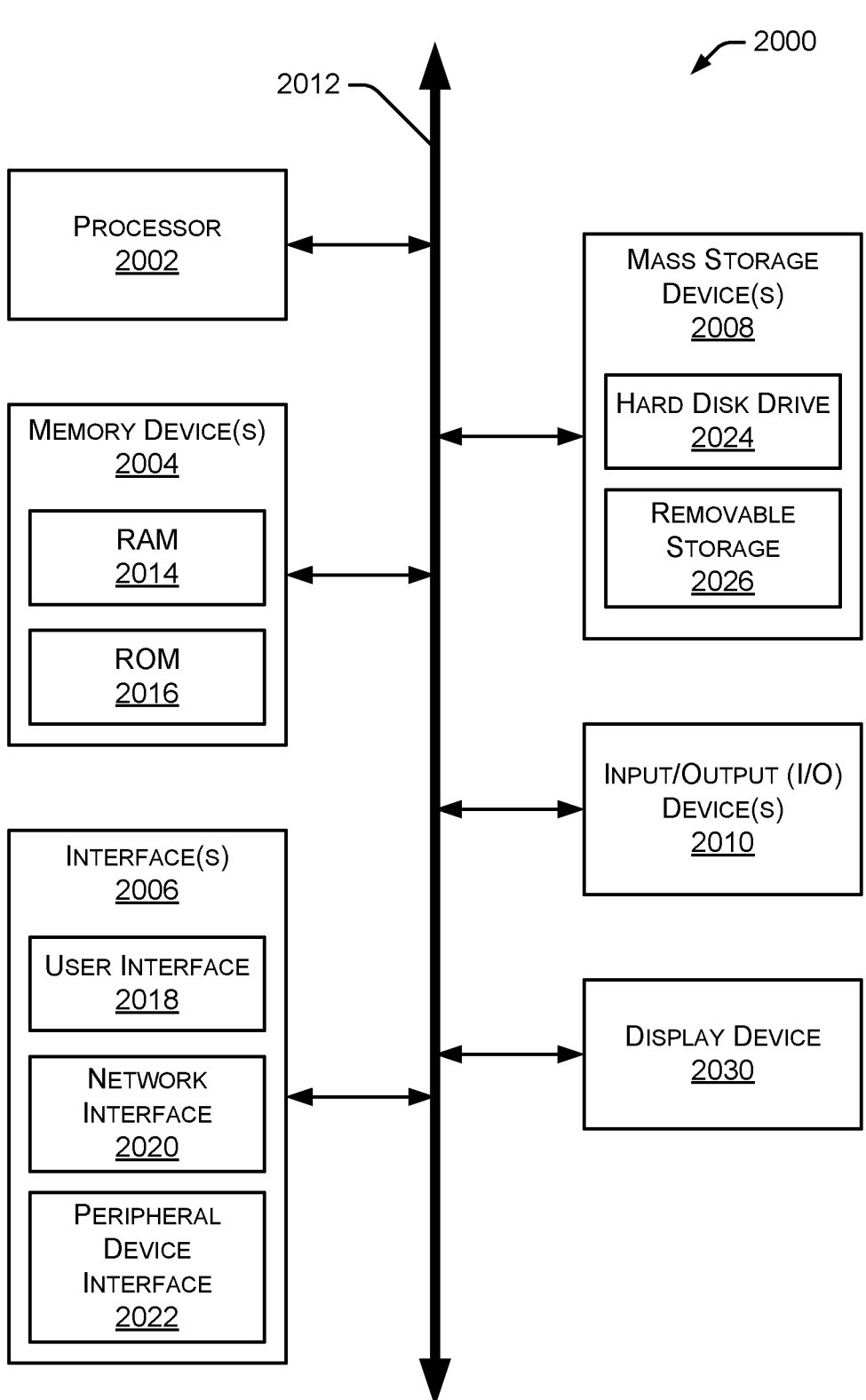
FIG. 20 illustrates an example block diagram of a computing device.

FIG. 20 illustrates an example block diagram of a computing device 2000 suitable for implementing the systems and methods described herein. In some embodiments, a cluster of computing devices interconnected by a network may be used to implement any one or more components of the systems discussed herein.

Computing device 2000 may be used to perform various procedures, such as those discussed herein. Computing device 2000 can function as a server, a client, or any other computing entity. Computing device can perform various functions as discussed herein, and can execute one or more application programs, such as the application programs described herein. Computing device 2000 can be any of a wide variety of computing devices, such as a desktop computer, a notebook computer, a server computer, a handheld computer, tablet computer and the like.

Computing device 2000 includes one or more processor(s) 2002, one or more memory device(s) 2004, one or more interface(s) 2006, one or more mass storage device(s) 2008, one or more Input/Output (I/O) device(s) 2010, and a display device 2030 all of which are coupled to a bus 2012. Processor(s) 2002 include one or more processors or controllers that execute instructions stored in memory device(s) 2004 and/or mass storage device(s) 2008. Processor(s) 2002 may also include various types of computer-readable media, such as cache memory.

Memory device(s) 2004 include various computer-readable media, such as volatile memory (e.g., random access memory (RAM) 2014) and/or nonvolatile memory (e.g., read-only memory (ROM) 2016). Memory device(s) 2004 may also include rewritable ROM, such as Flash memory.

Mass storage device(s) 2008 include various computer readable media, such as magnetic tapes, magnetic disks, optical disks, solid-state memory (e.g., Flash memory), and so forth. As shown in FIG. 20, a particular mass storage device is a hard disk drive 2024. Various drives may also be included in mass storage device(s) 2008 to enable reading from and/or writing to the various computer readable media. Mass storage device(s) 2008 include removable media 2026 and/or non-removable media.

I/O device(s) 2010 include various devices that allow data and/or other information to be input to or retrieved from computing device 2000. Example I/O device(s) 2010 include cursor control devices, keyboards, keypads, microphones, monitors or other display devices, speakers, printers, network interface cards, modems, lenses, CCDs or other image capture devices, and the like.

Display device 2030 includes any type of device capable of displaying information to one or more users of computing device 2000. Examples of display device 2030 include a monitor, display terminal, video projection device, and the like.

Interface(s) 2006 include various interfaces that allow computing device 2000 to interact with other systems, devices, or computing environments. Example interface(s) 2006 include any number of different network interfaces 2020, such as interfaces to local area networks (LANs), wide area networks (WANs), wireless networks, and the Internet. Other interface(s) include user interface 2018 and peripheral device interface 2022. The interface(s) 2006 may also include one or more user interface elements 2018. The interface(s) 2006 may also include one or more peripheral interfaces such as interfaces for printers, pointing devices (mice, track pad, etc.), keyboards, and the like.

Bus 2012 allows processor(s) 2002, memory device(s) 2004, interface(s) 2006, mass storage device(s) 2008, and I/O device(s) 2010 to communicate with one another, as well as other devices or components coupled to bus 2012. Bus 2012 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 2000, and are executed by processor(s) 2002. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

While various embodiments of the present disclosure are described herein, it should be understood that they are presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the described exemplary embodiments, but should be defined only in accordance with the following claims and their equivalents. The description herein is presented for the purposes of illustration and description. It is not intended to be exhaustive or to limit the disclosure to the precise form disclosed. Many modifications and variations are possible in light of the disclosed teaching. Further, it should be noted that any or all of the alternate implementations discussed herein may be used in any combination desired to form additional hybrid implementations of the disclosure.

The invention claimed is:

1. An apparatus comprising:
   a camera to capture 6DOF (6 Degrees of Freedom) 3D (Three-Dimensional) videos while the camera is in motion;
a rendering system coupled to the camera and configured to render the 6DOF 3D videos while minimizing vestibulo-ocular conflict, wherein minimizing vestibulo-ocular conflict includes:
   estimating an orientation of gravity relative to the camera; and
   adjusting a rotation of the rendered 6DOF 3D videos, based on the estimated orientation of gravity, to maintain a level horizon; and
   a virtual reality system coupled to the rendering system and configured to present the rendered 6DOF 3D videos to a user of the virtual reality system.

2. The apparatus of claim 1, wherein the camera is associated with a pair of wearable glasses to record 6DOF 3D video as a user wears the glasses.

3. The apparatus of claim 1, wherein the camera is associated with at least one of a wearable device, a helmet, a hat, an article of clothing, a drone, an unmanned aerial vehicle (UAV), or a robotic system.

4. The apparatus of claim 1, wherein minimizing vestibulo-ocular conflict includes:
   eliminating a rotation associated with the camera such that the user only sees rotation that is created by the user.

5. The apparatus of claim 1, wherein minimizing vestibulo-ocular conflict includes:
   creating a virtual camera that travels along a trajectory with no acceleration.

6. The apparatus of claim 5, wherein the virtual camera follows a trajectory with a plurality of straight segments with no acceleration.

7. The apparatus of claim 6, wherein the virtual camera instantaneously transitions from a first segment to a second segment in the trajectory.

8. The apparatus of claim 1, wherein minimizing vestibulo-ocular conflict reduces motion sickness associated with vestibulo-ocular conflict.

9. The apparatus of claim 1, wherein presenting the rendered 6DOF 3D videos to a user of the virtual reality system includes presenting the rendered 6DOF 3D videos in a manner that responds to the user's movement while wearing a head-mounted virtual reality display.

* * * * *